(12) United States Patent
Thomas

(10) Patent No.: US 10,844,998 B2
(45) Date of Patent: Nov. 24, 2020

(54) CAMERA GIMBAL

(71) Applicant: Kevin Albert Thomas, Langhorne, PA (US)

(72) Inventor: Kevin Albert Thomas, Langhorne, PA (US)

(*) Notice: Subject to any disclaimer, the term of this patent is extended or adjusted under 35 U.S.C. 154(b) by 0 days.

(21) Appl. No.: 16/424,581

(22) Filed: May 29, 2019

(65) Prior Publication Data
US 2019/0368654 A1 Dec. 5, 2019

Related U.S. Application Data

(60) Provisional application No. 62/677,505, filed on May 29, 2018.

(51) Int. Cl.
F16M 11/18 (2006.01)
F16M 11/12 (2006.01)
F16H 57/031 (2012.01)
G03B 17/56 (2006.01)
F16H 57/00 (2012.01)
F16H 57/02 (2012.01)

(52) U.S. Cl.
CPC ......... F16M 11/18 (2013.01); F16H 57/0006 (2013.01); F16H 57/031 (2013.01); F16M 11/123 (2013.01); G03B 17/561 (2013.01); F16H 2057/02039 (2013.01); F16M 2200/041 (2013.01)

(58) Field of Classification Search
CPC ........ G03B 17/56; F16M 11/04; F16M 11/12; F16M 11/10; F16M 11/18

USPC ......................................................... 396/428
See application file for complete search history.

(56) References Cited

U.S. PATENT DOCUMENTS

| 4,886,230 | A | * | 12/1989 | Jones | F16M 11/14 248/170 |
| 5,366,193 | A | * | 11/1994 | Lindsay | F16F 9/12 248/183.2 |
| 8,029,197 | B2 | * | 10/2011 | McKay | F16M 11/2057 396/421 |
| 8,714,744 | B2 | * | 5/2014 | Greaves | F16M 11/123 348/373 |
| 9,201,292 | B1 | * | 12/2015 | Folgarelli | G03B 17/561 |
| 9,874,308 | B2 | * | 1/2018 | Saika | F16M 11/121 |
| 9,904,149 | B2 | * | 2/2018 | Casarez | F16M 11/16 |
| 2002/0090216 | A1 | * | 7/2002 | Melitopoulos | F16M 13/00 396/428 |

(Continued)

Primary Examiner — Clayton E. LaBalle
Assistant Examiner — Kevin C Butler
(74) Attorney, Agent, or Firm — Howson & Howson LLP

(57) ABSTRACT

A camera gimbal has a gearbox including a housing containing therein a central main gear secured to a bearing shaft in a fixed-position relative to the bearing shaft and at least one rotary damper secured to the housing at a fixed-location relative to the housing. The at least one rotary damper is engaged with the central main gear in a manner permitting rotation of the at least one rotary damper about a periphery of the main central gear such that the housing rotates about an axis of rotation extending longitudinally through the bearing shaft and the central main gear. A camera-mount extends from the housing. Gravity acting on the mass/weight of the camera and a counterweight causes rotation of the gearbox to maintain the camera in a relatively level position while the at least one rotary damper damps the rotational movement of the gearbox.

14 Claims, 18 Drawing Sheets

(56) References Cited

U.S. PATENT DOCUMENTS

| | | | |
|---|---|---|---|
| 2005/0196163 A1* | 9/2005 | Mootz | F16M 11/041 396/428 |
| 2007/0155228 A1* | 7/2007 | Nama | F16M 11/10 439/567 |
| 2009/0003822 A1* | 1/2009 | Tyner | F16M 11/32 396/428 |
| 2013/0236167 A1* | 9/2013 | Tardieu | F16M 11/2078 396/428 |
| 2017/0064176 A1* | 3/2017 | Kim | G02B 27/644 |
| 2017/0163896 A1* | 6/2017 | Kang | G03B 15/006 |
| 2018/0266621 A1* | 9/2018 | Zhang | F16M 11/10 |
| 2019/0368654 A1* | 12/2019 | Thomas | F16M 11/18 |

\* cited by examiner

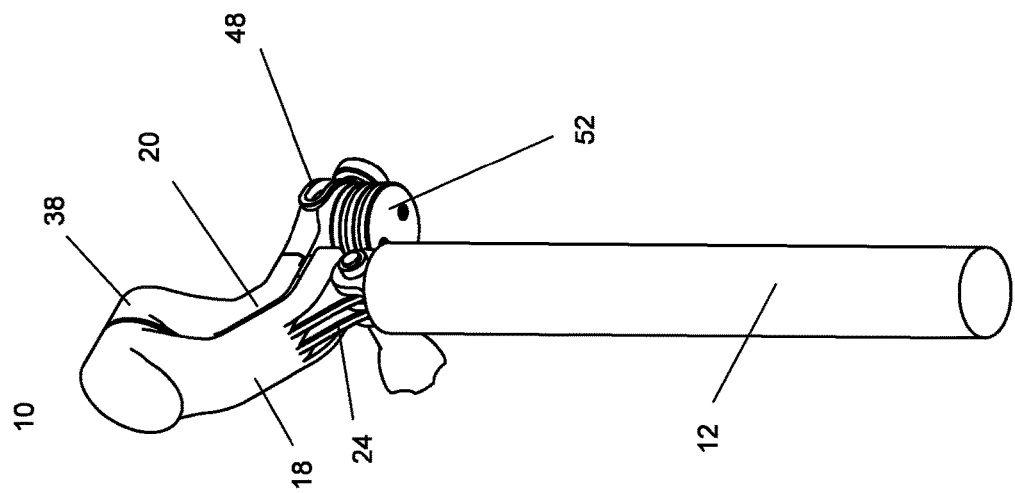
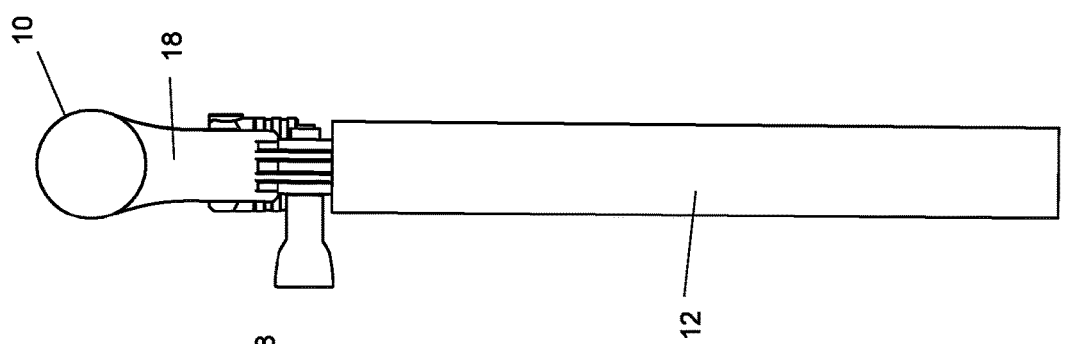
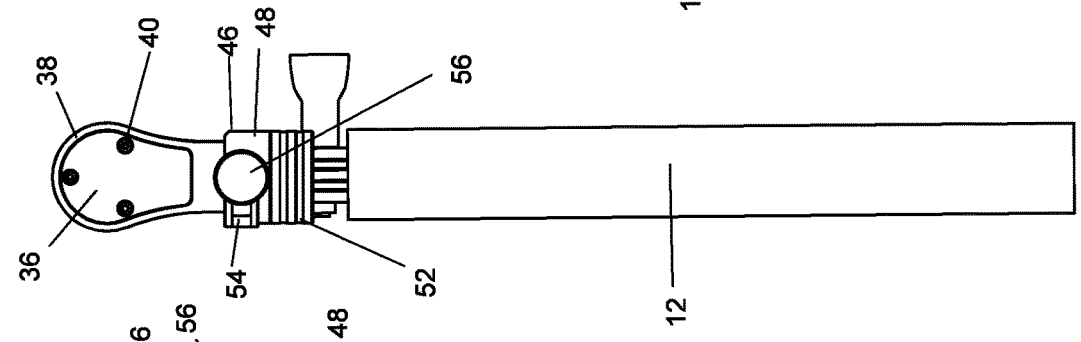
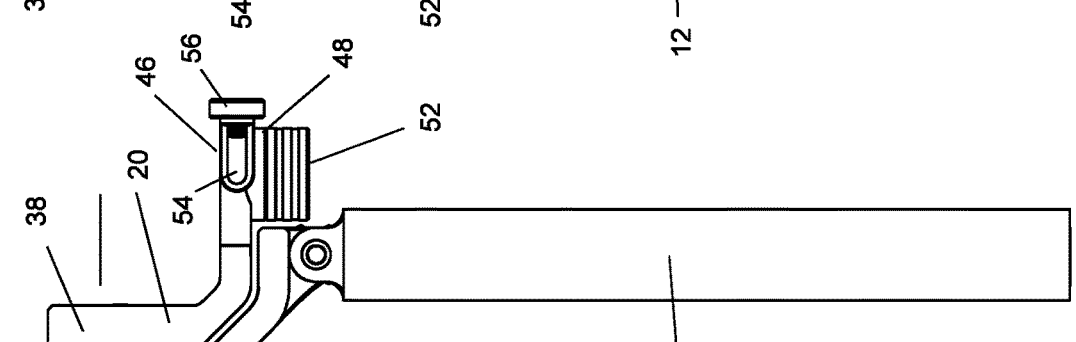

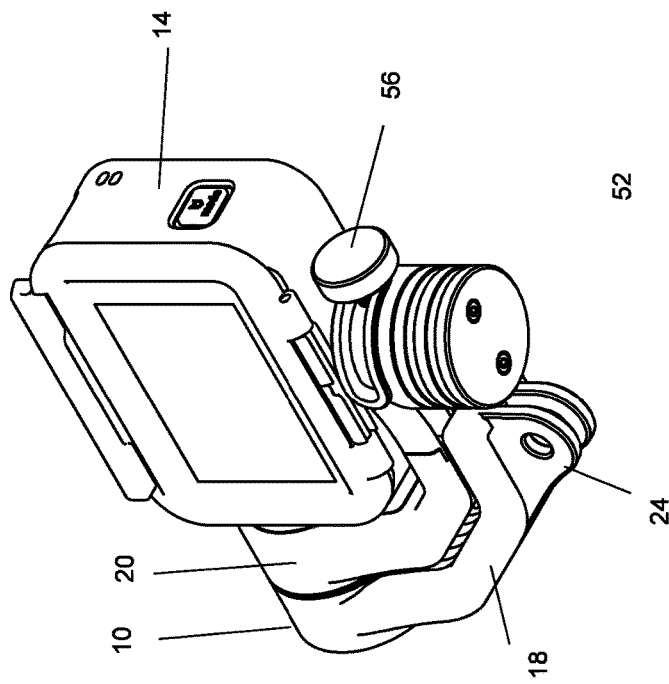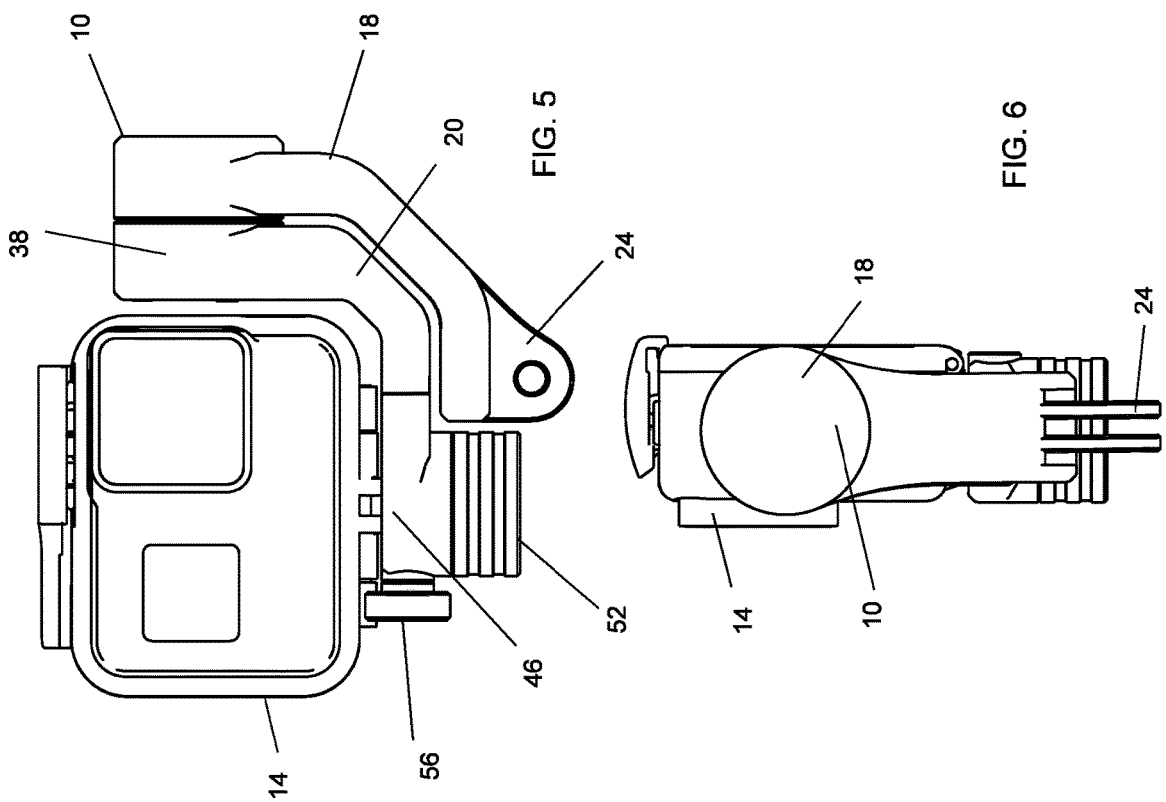

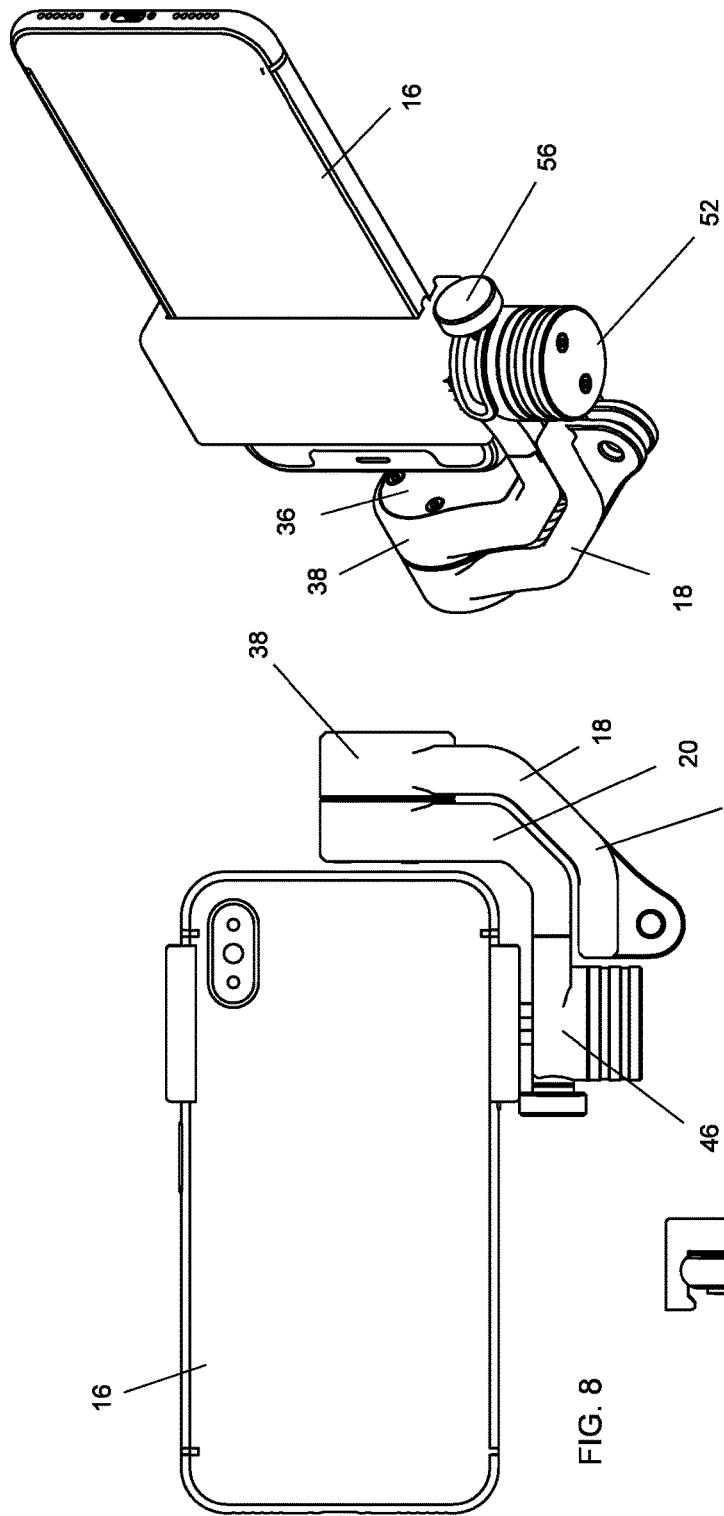

CAMERA GIMBAL

CROSS REFERENCE TO RELATED APPLICATIONS

This application claims the benefit under 35 USC § 119(e) of U.S. Provisional Patent Application No. 62/677,505, filed May 29, 2018.

BACKGROUND

The present invention relates to stabilizing videography footage.

Shaky or blurred images are often produced by a camera held or secured to a moving person or object as the movement of the person or object is necessarily transmitted to the camera. For example, a digital camera, a smartphone having a camera, or like electronic device may be held by a user performing an activity (i.e., skateboarding, bicycling, skiing, or other activity) or may be mounted to an object in motion. As a result, the motion may affect the quality of the media captured by the camera, causing blurry pictures, shaky footage, or other low-quality media. This can also result when repositioning a camera secured to a tripod.

A user may secure their camera to a gimbal, which is a device that can manipulate the orientation of the camera so as to correct for movement. Thus, the use of a gimbal provides a camera stabilization technique that can reduce the effects of motion on images, particularly video, recorded by the camera.

Consumers often will own different types of cameras having different characteristics such as size, weight, and the like. For instance, a consumer may have a relatively small, thin, and lightweight smartphone with a camera and may also have one or more relatively larger and/or heavier digital camera. A gimbal is typically designed to support only a particular type of camera in a balanced manner which takes into account only a limited range of size and weight of the camera.

SUMMARY

According to an embodiment, a camera gimbal is provided. The camera gimbal includes a gearbox having a housing containing therein a central main gear secured to a bearing shaft in a fixed-position relative to the bearing shaft and at least one rotary damper secured to the housing at a fixed-location relative to the housing. The at least one rotary damper is engaged with the central main gear in a manner permitting rotation of the at least one rotary damper about a periphery of the main central gear such that the housing rotates about an axis of rotation extending longitudinally through the bearing shaft and the central main gear. A camera-mount extends from the gearbox on which a camera may be mounted. Gravity acting on the mass/weight of the camera causes rotation of the gearbox to maintain the camera in a relatively level position while the at least one rotary damper damps the rotational movement of the gearbox.

BRIEF DESCRIPTION OF THE DRAWINGS

The foregoing and other objects, features and advantages of the embodiments disclosed herein should become apparent from the following description when taken in conjunction with the accompanying drawings.

FIG. 1 is a front elevational view of a camera gimbal mounted to a handle according to a first embodiment;
FIG. 2 is a left-side elevational view of the camera gimbal and handle of FIG. 1;
FIG. 3 is a right-side elevational view of the camera gimbal and handle of FIG. 1;
FIG. 4 is a perspective view of the camera gimbal and handle of FIG. 1;
FIG. 5 is a front elevational view of a camera mounted in a tilt position on the camera gimbal of FIG. 1;
FIG. 6 is a side elevational view of the camera and camera gimbal of FIG. 5;
FIG. 7 is a perspective view of the camera and camera gimbal of FIG. 5;
FIG. 8 is a front elevational view of a smartphone mounted in a tilt position on the camera gimbal of FIG. 1;
FIG. 9 is a side elevational view of the smartphone and camera gimbal of FIG. 8;
FIG. 10 is a perspective view of the smartphone and camera gimbal of FIG. 8.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to embodiments, a camera gimbal is provided that ensures smooth and stable movement of a camera, smartphone, or other electronic device mounted therein. The camera gimbal may be mounted on the end of an elongate portable pole or handle or like equipment held, attached to, or controlled by a person in motion or in a stationary position. The gimbal comprises at least one purely mechanical gearbox defining at least one rotational axis and set to automatically control the speed of rotation of the camera about the axis. The resistance of at least one rotary gear or other energy-absorbing mechanism in the gearbox eliminates or reduces vibrations of the camera as it is moved while the camera captures video and/or still images.

According to embodiments, each gearbox may contain a central main gear through which an axis of rotation is defined and at least one rotary damper, such as a hydraulic rotary damper gear or the like, engaged to the central gear along a periphery thereof for traveling in a circular path about the periphery. The specific rotary damper and/or the number of rotary dampers may be selected to produce the desired damping affects.

According to embodiments, a camera mount or the like to which a camera may be adjustably mounted in a balanced manner on the gimbal may extend from the gearbox and/or may form an end part of the gearbox. The camera mount may automatically be maintained in or returned to a position extending upright and parallel to the ground by balance weights or the like such that a camera secured thereto may be held in an upright position based solely on the forces of gravity to capture or record images in a substantially level position.

By way of example, a first embodiment of a camera gimbal 10 is shown in FIGS. 1-4. The camera gimbal 10 is shown connected to a portable handle 12 or the like which can be held by the end user or the like. Of course, the gimbal 10 can be connected to other equipment or the like.

Figure 13:
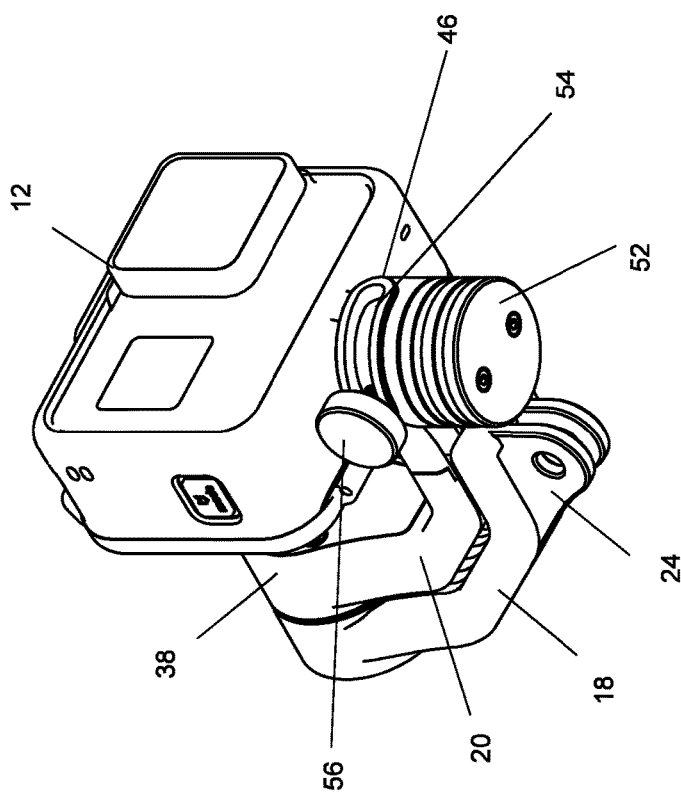
FIG. 13 is a perspective view of the camera and camera gimbal of FIG. 11.
Figure 11:
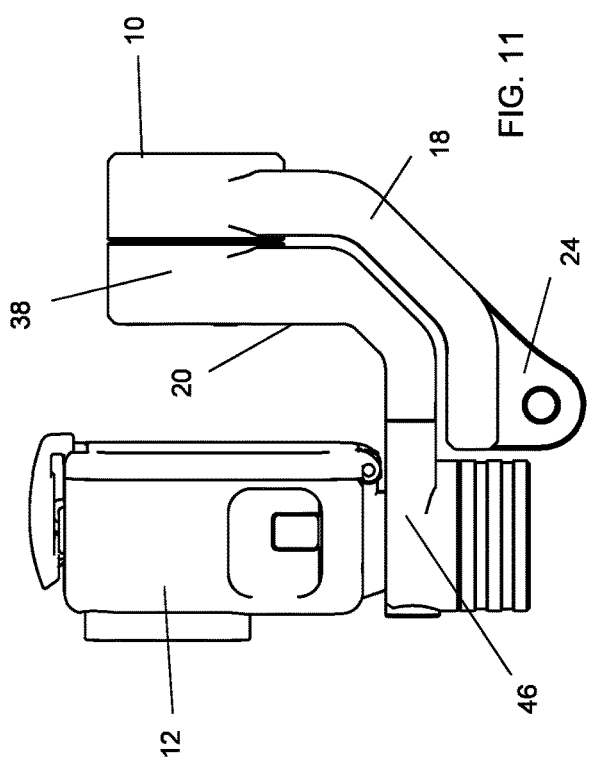
FIG. 11 is a front elevational view of a camera mounted in a roll position on the camera gimbal of FIG. 1.
Figure 12:
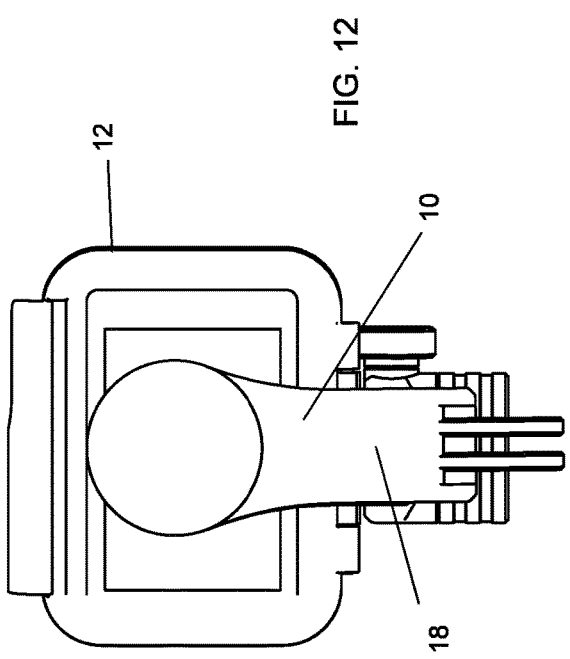
FIG. 12 is a side elevational view of the camera and camera gimbal of FIG. 11.
Figure 16:
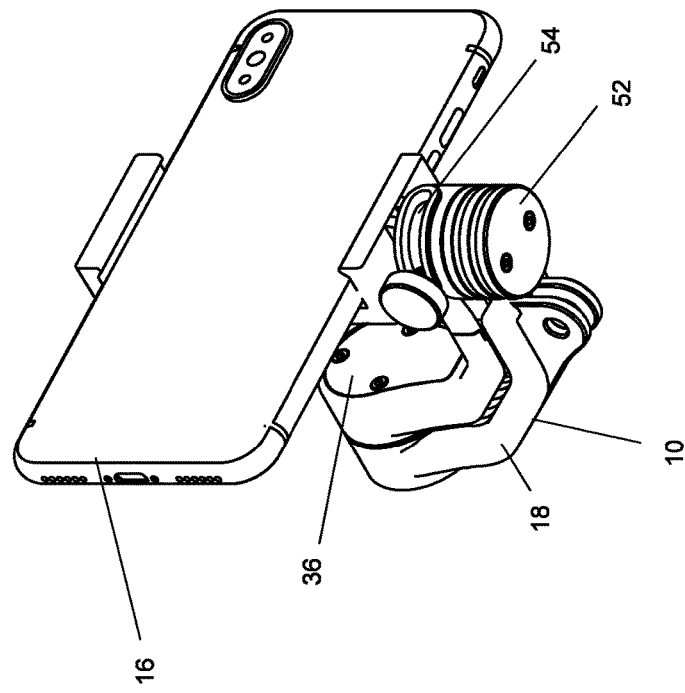
FIG. 16 is a perspective view of the smartphone and camera gimbal of FIG. 14.
Figure 14:
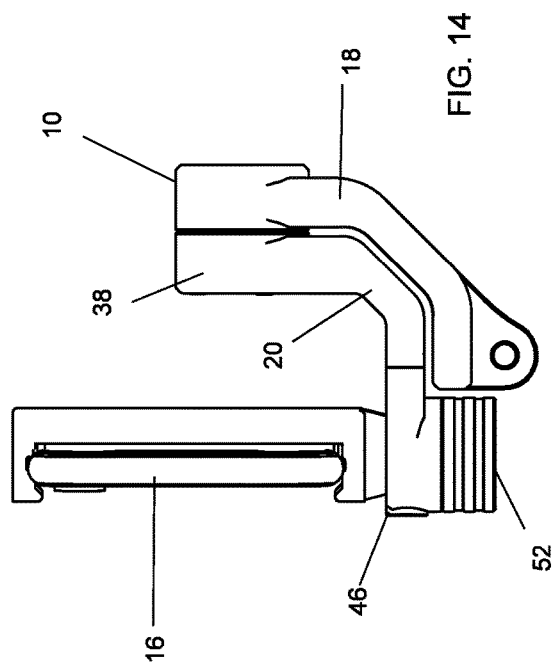
FIG. 14 is a front elevational view of a smartphone mounted in a roll position on the camera gimbal of FIG. 1.
Figure 15:
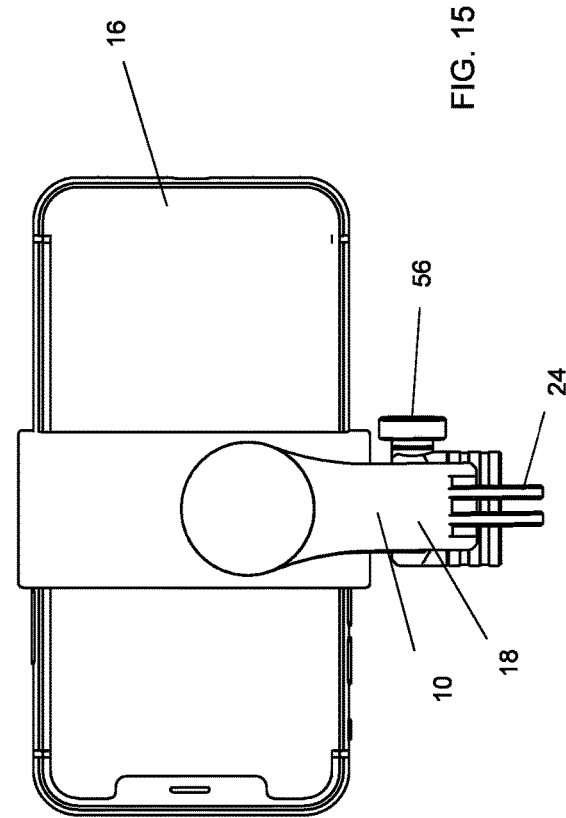
FIG. 15 is a side elevational view of the smartphone and camera gimbal of FIG. 14.

FIGS. 5-15 show a camera 14 and a smartphone 16 having a camera mounted on the gimbal 10 in two different fixed orientations, i.e., a tilt position and roll position. These two positions may be offset by about 90° of rotation. For instance, FIGS. 5-7 show the camera 14 mounted in a tilt position on the gimbal 10; FIGS. 8-10 show the smartphone 16 mounted in the tilt position on the gimbal 10; FIGS. 11-13 show the camera 14 mounted in a roll position on the gimbal 10; and FIGS. 14-16 show the smartphone 16 mounted in the roll position on the gimbal 10.

Figure 17:
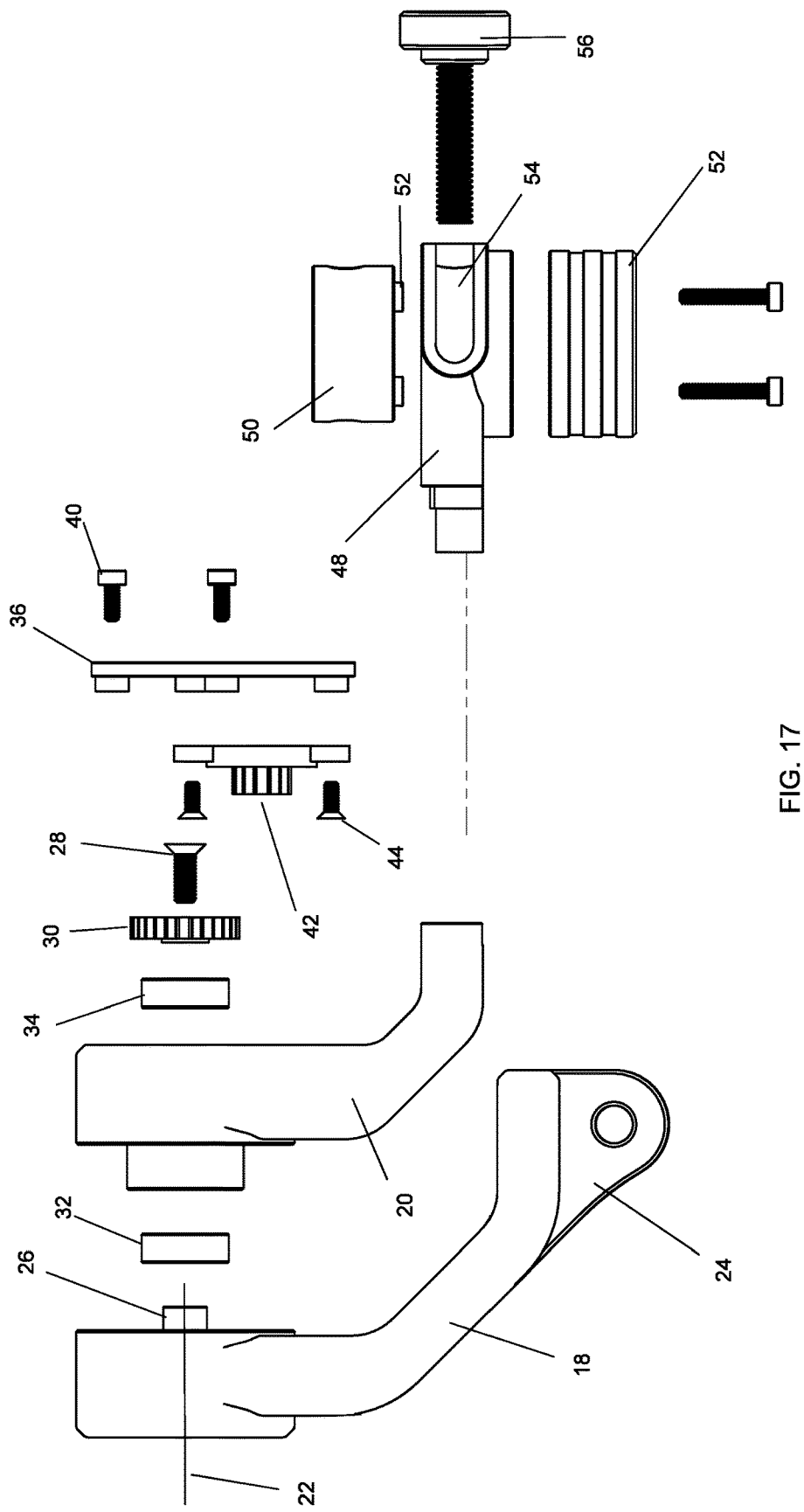
FIG. 17 is an exploded elevational side view of the camera gimbal of FIG. 1.
Figure 18:
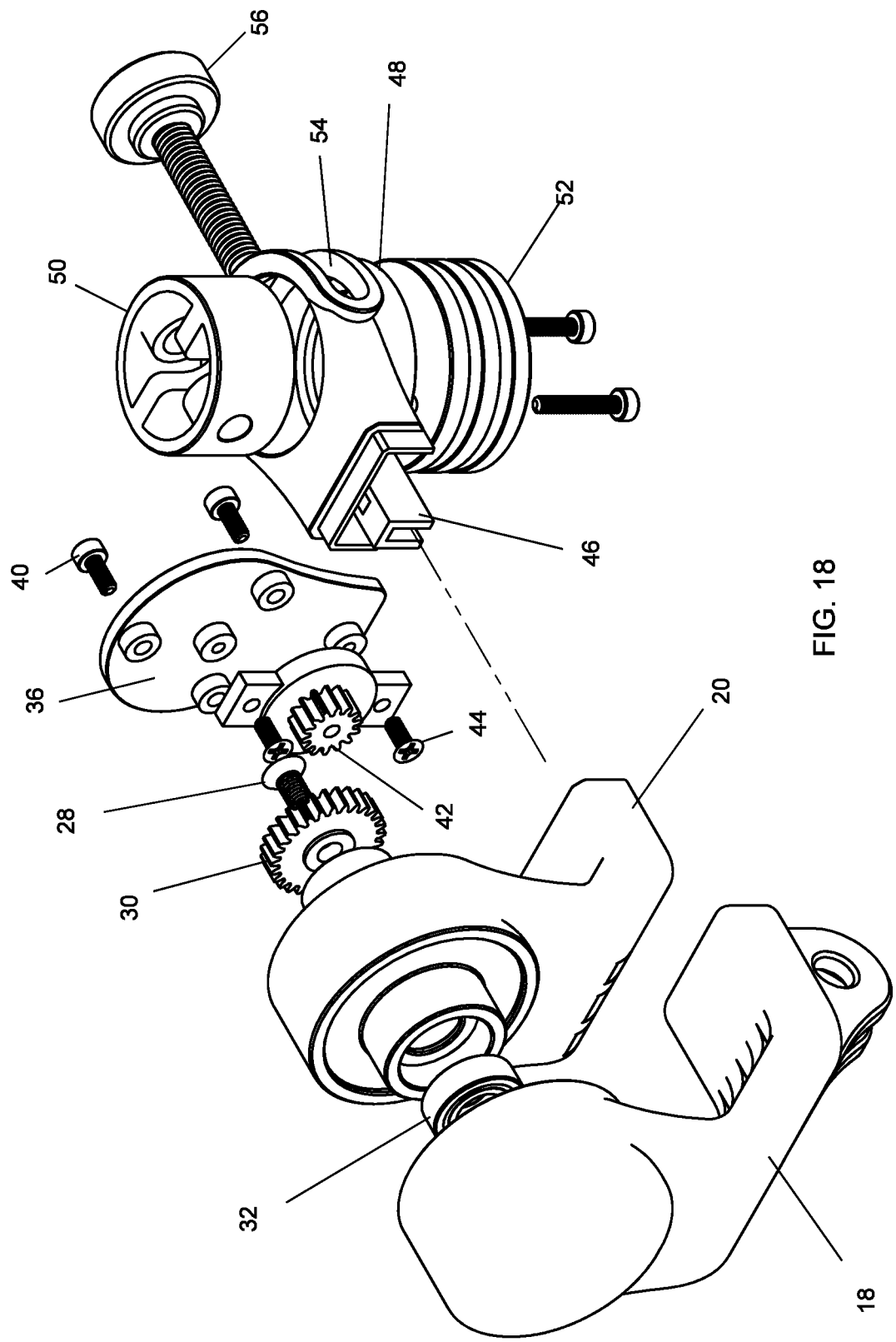
FIG. 18 is an exploded perspective view of the camera gimbal of FIG. 1.
Figure 19:
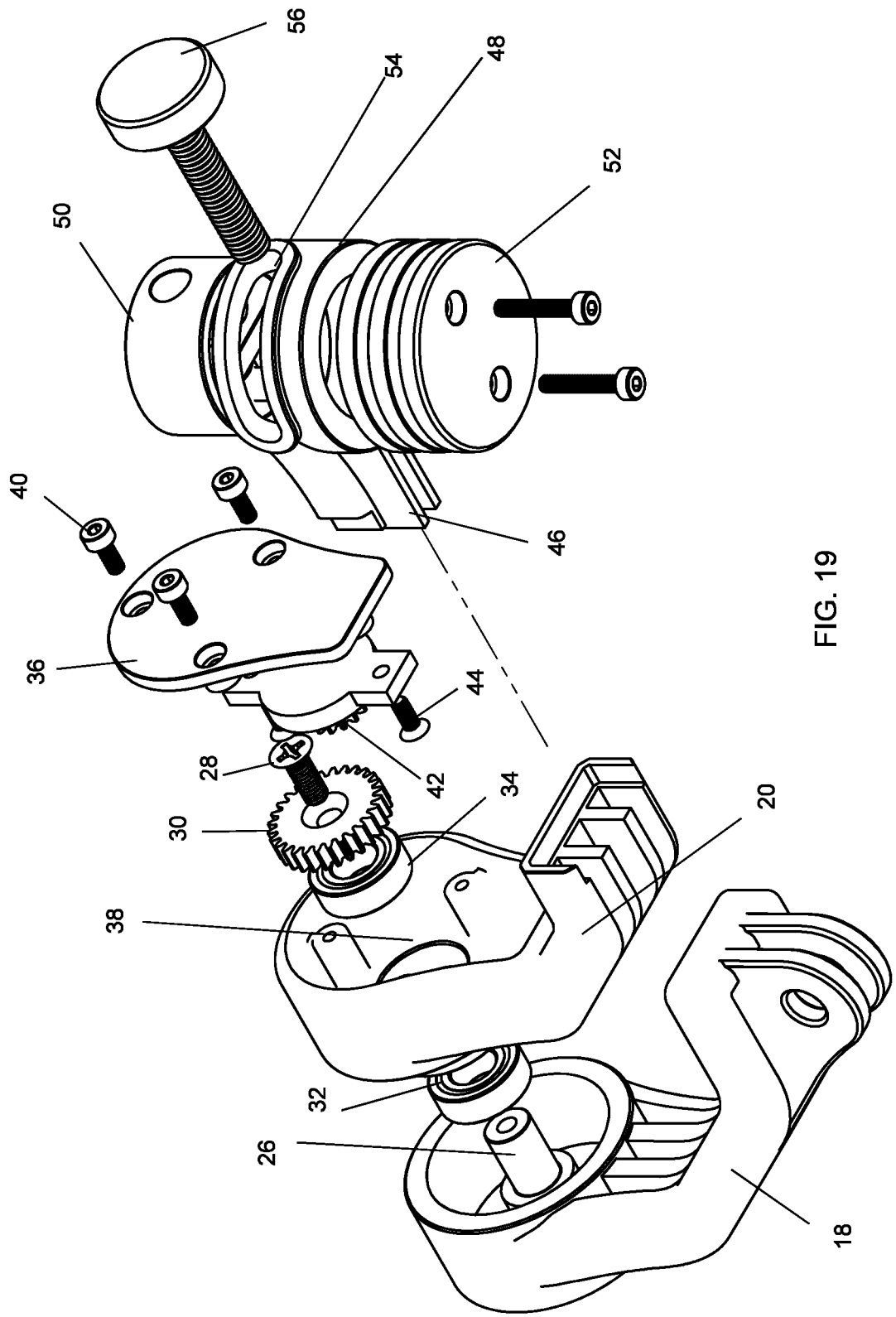
FIG. 19 is an exploded perspective view of the camera gimbal of FIG. 1.
Figure 20:
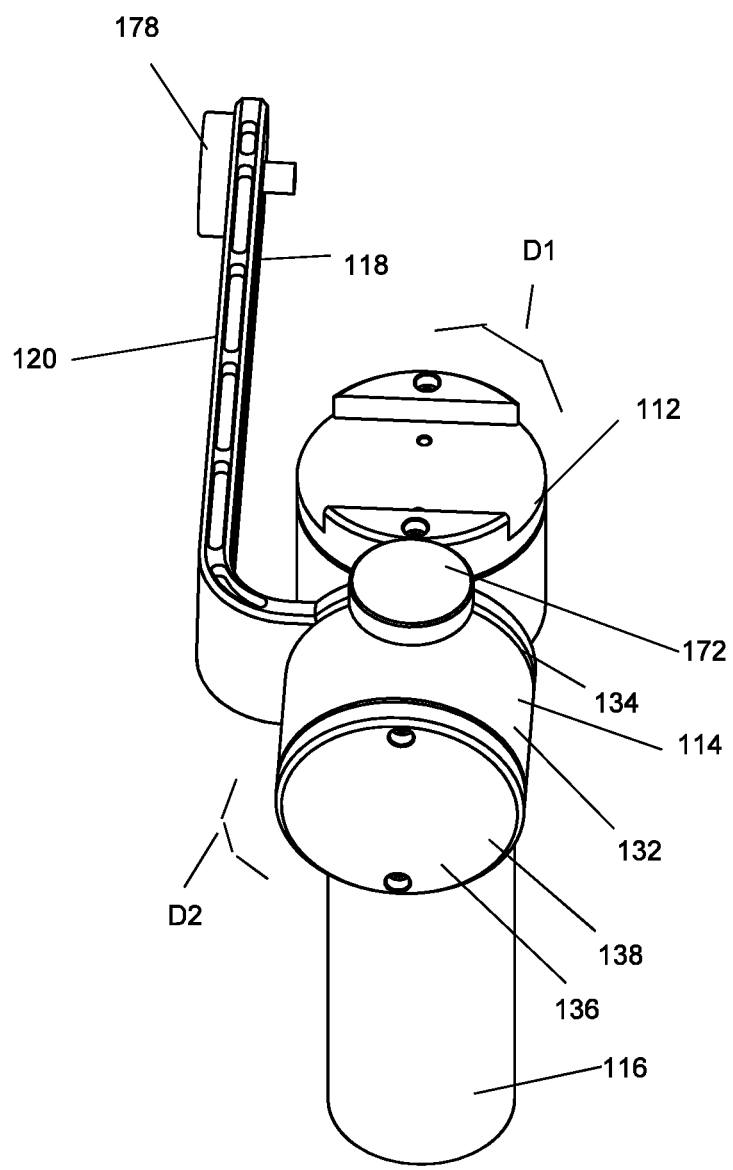
FIG. 20 is a perspective view of a camera gimbal according to a second embodiment.
Figure 21:
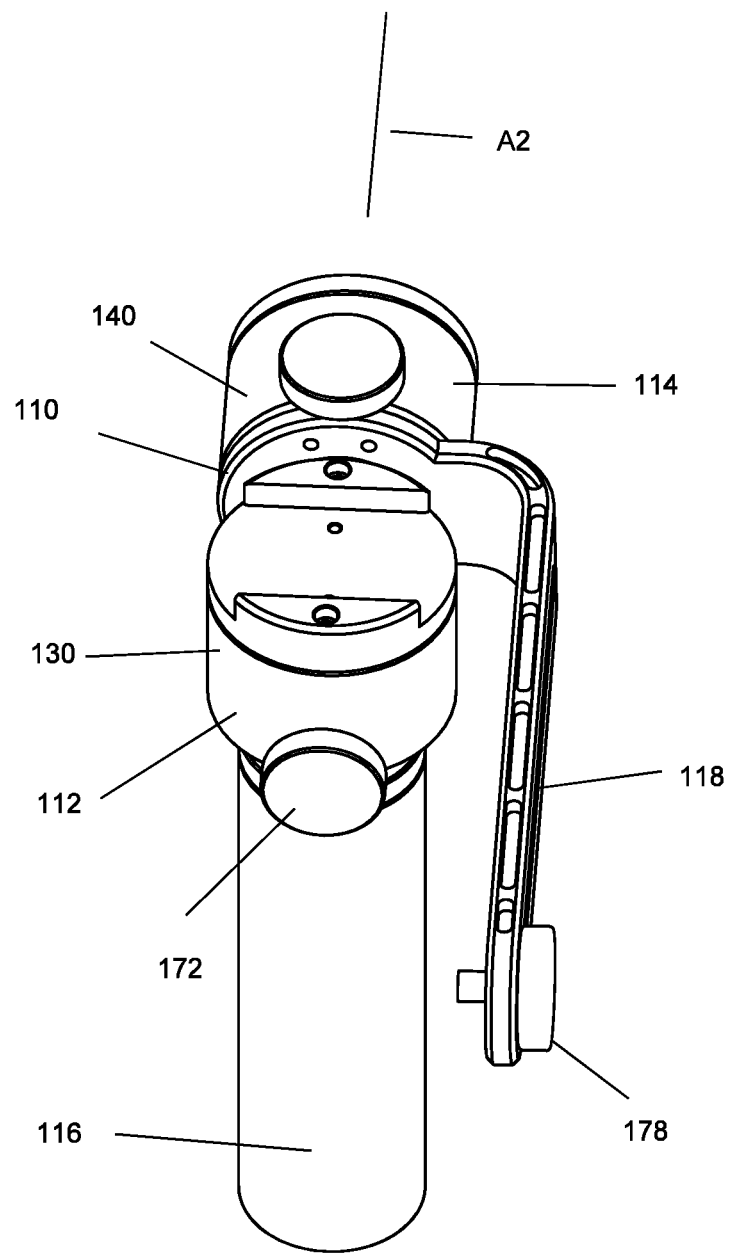
FIG. 21 is a perspective view from the opposite side of the camera gimbal of FIG. 20.
Figure 22:
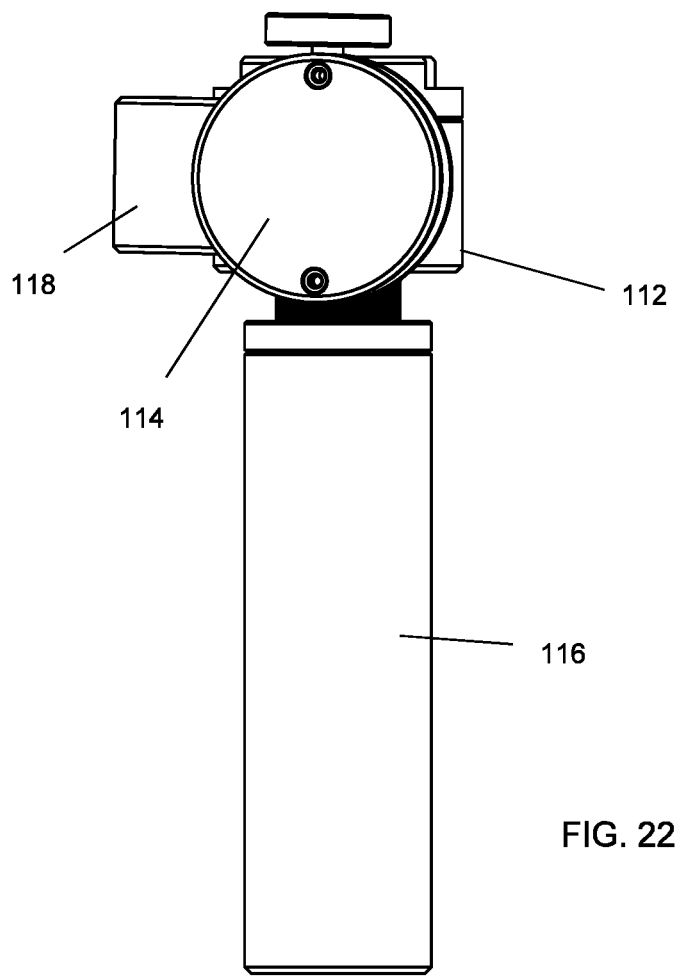
FIG. 22 is a side elevation view of the camera gimbal of FIG. 20.

As best shown in FIGS. 17-19, the gimbal 10 includes a first arm 18 and a second arm 20 such that the first and second arms are permitted to rotated relative to each other about an axis 22. The first arm includes a free end having a handle mounting flange 24 or the like to which the handle 12 or the like may be mounted. When mounted to the first arm 18, the handle 12 and first arm 18 remain fixed and stationary relative to each other. The opposite end of the first arm 18 includes a bearing shaft 26 which extends along and defines the axis of rotation 22.

The second arm 20 includes an end that forms part of a housing of a gearbox that is mounted about the bearing shaft 26 such that the second arm 20 is able to rotate about the bearing shaft 26. A fastener 28, such as a screw, mounts a central gear 30 to the bearing shaft 26. The second arm 18 is captured on the bearing shaft 26 by the central gear 30 between a pair of bearings, 32 and 34. The central gear 30 remains stationary relative to the bearing shaft 26 and the second arm 20 is able to rotate relative to the central gear 30.

A lid 36 cooperates with the a hollow section of the second arm 20 to enclose the central gear 30 therein and thereby define a gearbox 38. The lid 36 may be secured with fasteners 40 to the second arm 20. A rotary damper, such as a hydraulic rotary damper gear 42, is fastened to the lid 36 with fasteners 44 in a position such that the gear teeth of the rotary damper gear 42 mesh with the gear teeth of the central gear 30. Accordingly, since the lid 36 and rotary damper gear 42 are affixed to the second arm 20, both the lid 36 and rotary damper gear 42 rotate with the second arm 20 about the axis 22 defined by the bearing shaft 26. Further, since the gear teeth of the central gear 30 and rotary damper gear 42 are engaged, the rotary damper gear 42 travels around the periphery of the central gear 30 and thereby dampens or slows the relative rotation of the first and second arms, 18 and 20, in a stable manner.

A camera mount 46 is connected or formed at the free end of the second arm 20 on which a camera, smartphone, or like device can be connected or mounted as discussed above in tilt or roll positions. The camera mount 46 includes a holder 48, a camera mount component 50 located within the holder 48, and one or more camera balance weights or counterweights 52. The component 50 can be secured in the holder 48 in two different positions relative to the holder 48 (tilt and roll positions). For instance, the holder 48 may include a peripheral slot 54 through which a fastener 56 can be used to secure the component 50 in a stationary position relative to the holder 48. Thus, the lens of the camera can be oriented as desired with respect to the roll axis or the tilt axis. The balance weights 52 may be connected to the holder 48 or component 50 with fasteners 58 or the like and may be of a counterweight needed with the rotary damper to return or maintain the camera in an upright position on the camera mount 46 in a stable manner.

A second embodiment of a camera gimbal 110 is shown in FIGS. 20-29. The gimbal 110 includes first and second interconnected gearboxes, 112 and 114. A handle 116 or other type of mounting component is attached to and extends from the first gear box 112. The handle 116 is intended to be gripped or held by the end user or be connected to other mounting equipment. A camera mounting bracket 118 or the like extends from the second gearbox 114 and may be secured thereto with screws or other fasteners. A camera (not shown) may be mounted to the front 120 of the mounting bracket 118 such that the camera is mounted in a stationary fixed-position relative to the mounting bracket 118.

The gearbox 112 may have a generally disc-shaped housing or body 122 forming a bottom wall 124 of the gearbox 112 and a lid 126 forming a top wall 128 of the gearbox 112. The body 122 and lid 126 also form a generally cylindrical outer sidewall 130 extending between the top and bottom walls, 128 and 124. Of course, the gearbox 112 is not limited to a disc, annular or cylindrical shape as illustrated and could be provided in other shapes.

The gearbox 114 may have a construction identical or substantially identical to gearbox 112. Thus, gearbox 114 may have a generally disc-shaped housing or body 132 forming a bottom wall 134 of the gearbox 114 and a lid 136 forming a top wall 138 of the gearbox 114. The body 132 and lid 136 may also form a generally cylindrical sidewall 140 extending between the top and bottom walls, 138 and 134.

The gearboxes, 112 and 114, in the illustrated embodiment are interconnected with a mounting fastener 142 which extends from and interconnects the sidewall 130 of gearbox 112 to the bottom wall 134 of gearbox 114.

The first gearbox 112 is rotatable in the direction $D_1$ about the axis $A_1$ which extends longitudinally through the housing 124 through the top and bottom walls 128 and 124 and centrally through or concentrically relative to sidewall 130 of the first gearbox 112. The second gearbox 114 is rotatable in the direction $D_2$ about the axis $A_2$ which extends longitudinally through the housing 132 through the top and bottom walls 138 and 134 and centrally through or concentrically relative to sidewall 140 of the second gearbox 114. Accordingly, the handle 116, which interconnects to the bottom wall 124 of the first gearbox 112, extends along axis $A_1$, and the mounting fastener 142, which extends from the bottom wall 134 of the second gearbox 114, extends along axis $A_2$. In the illustrated embodiment, axis $A_1$ is perpendicular to axis $A_2$. Thus, the gearboxes, 112 and 114, provide the gimbal 110 with two axes of rotation for a camera mounted thereto.

Figure 26:
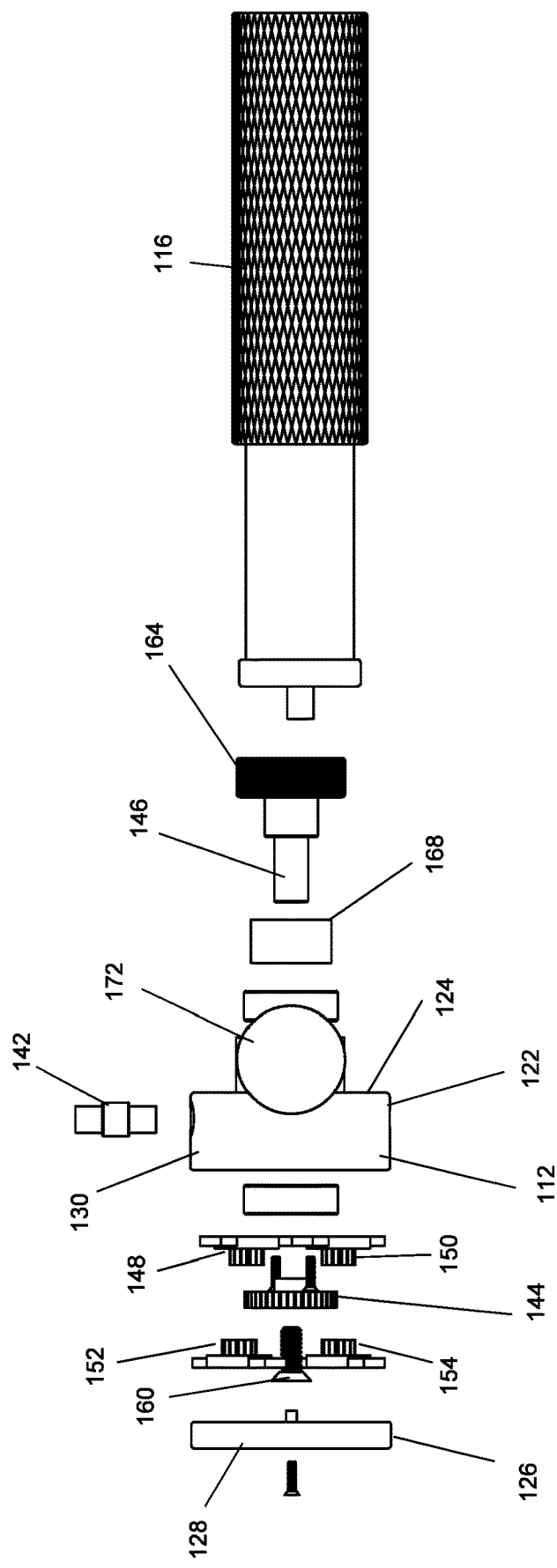
FIG. 26 is an exploded elevational side view of one of the gearboxes of the camera gimbal of FIG. 20.
Figure 27:
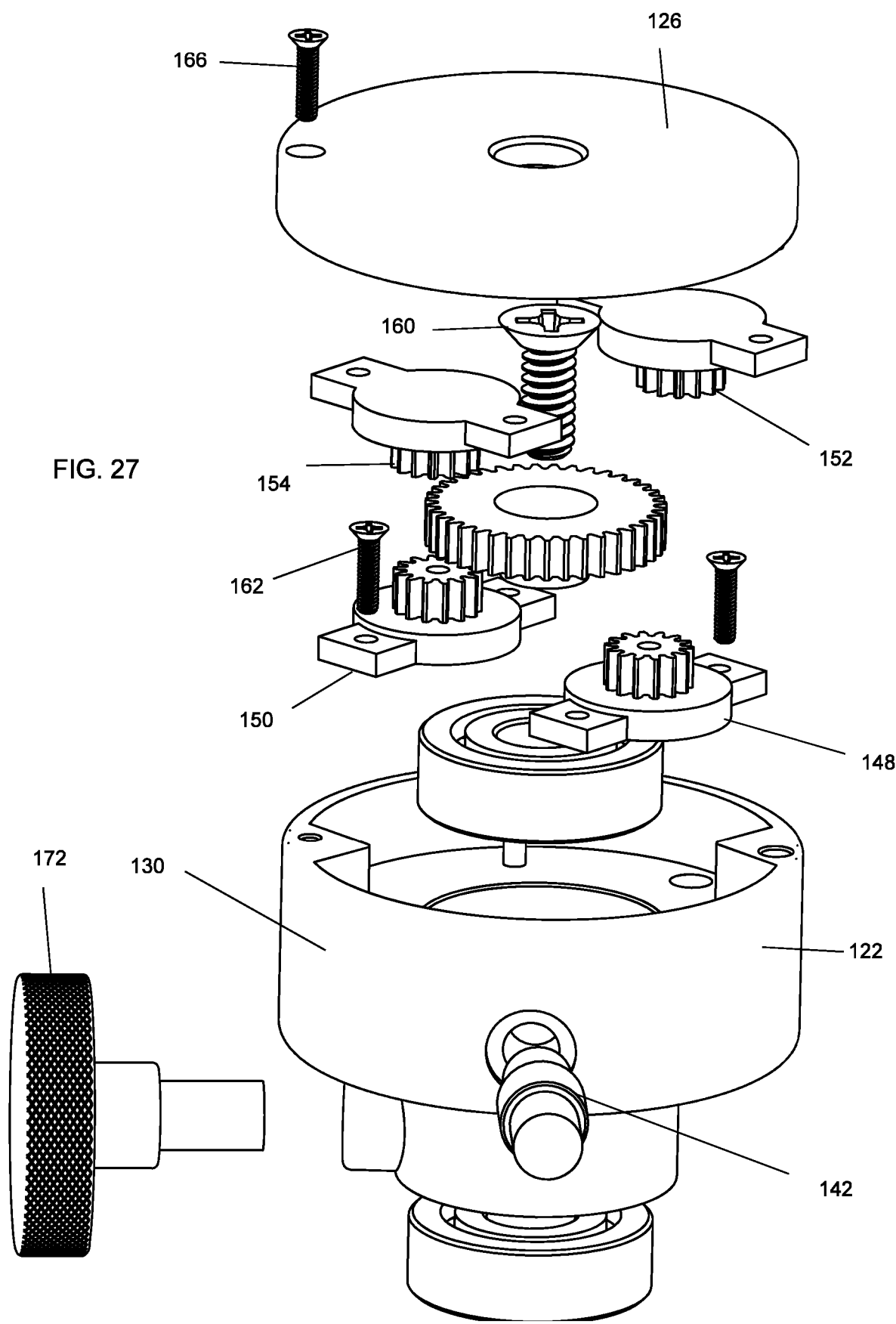
FIG. 27 is an exploded perspective view of the main gear and rotary dampers within the gearbox of FIG. 26.
Figure 28:
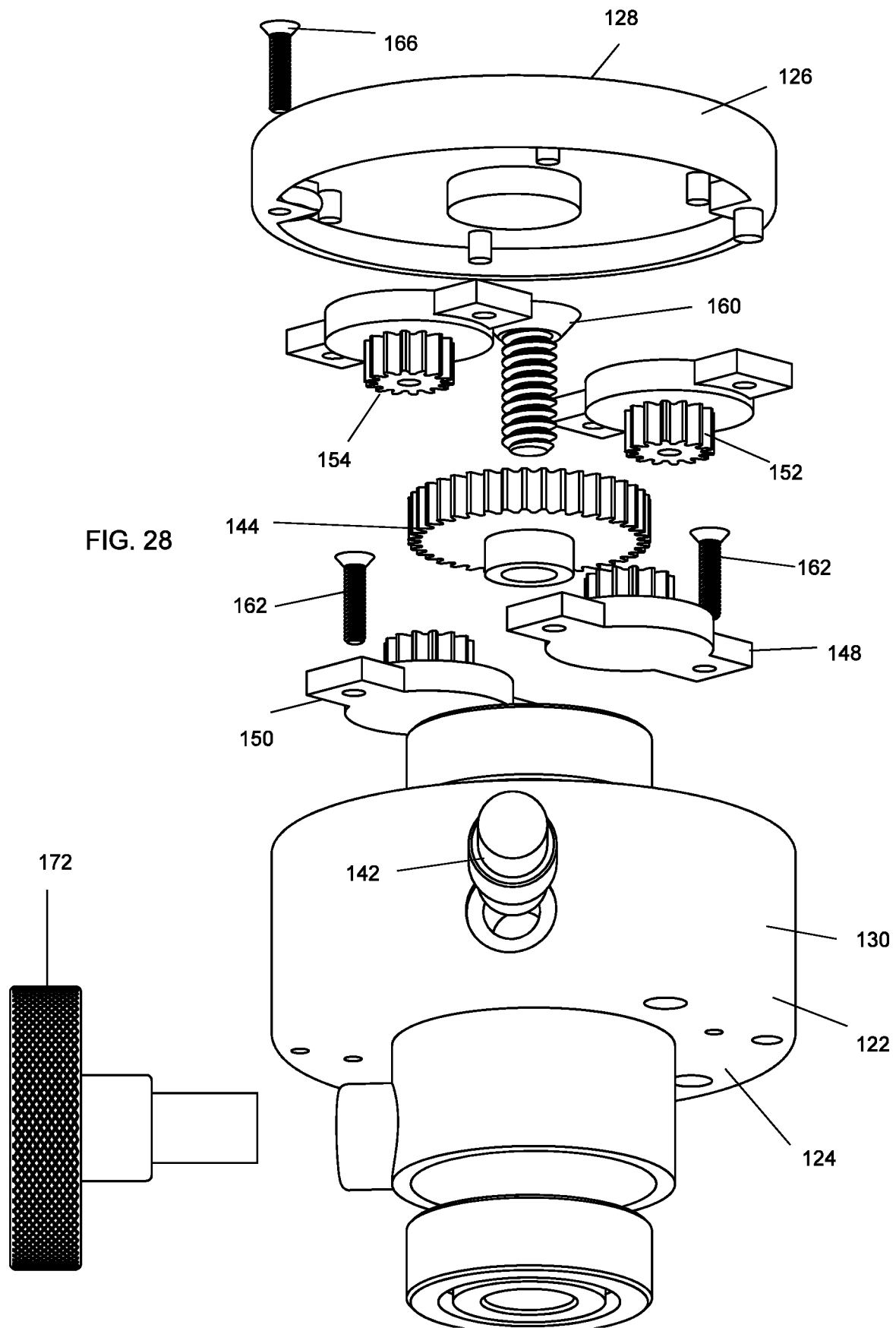
FIG. 28 is an exploded perspective view of the main gear and rotary dampers within the gearbox of FIG. 26.
Figure 29:
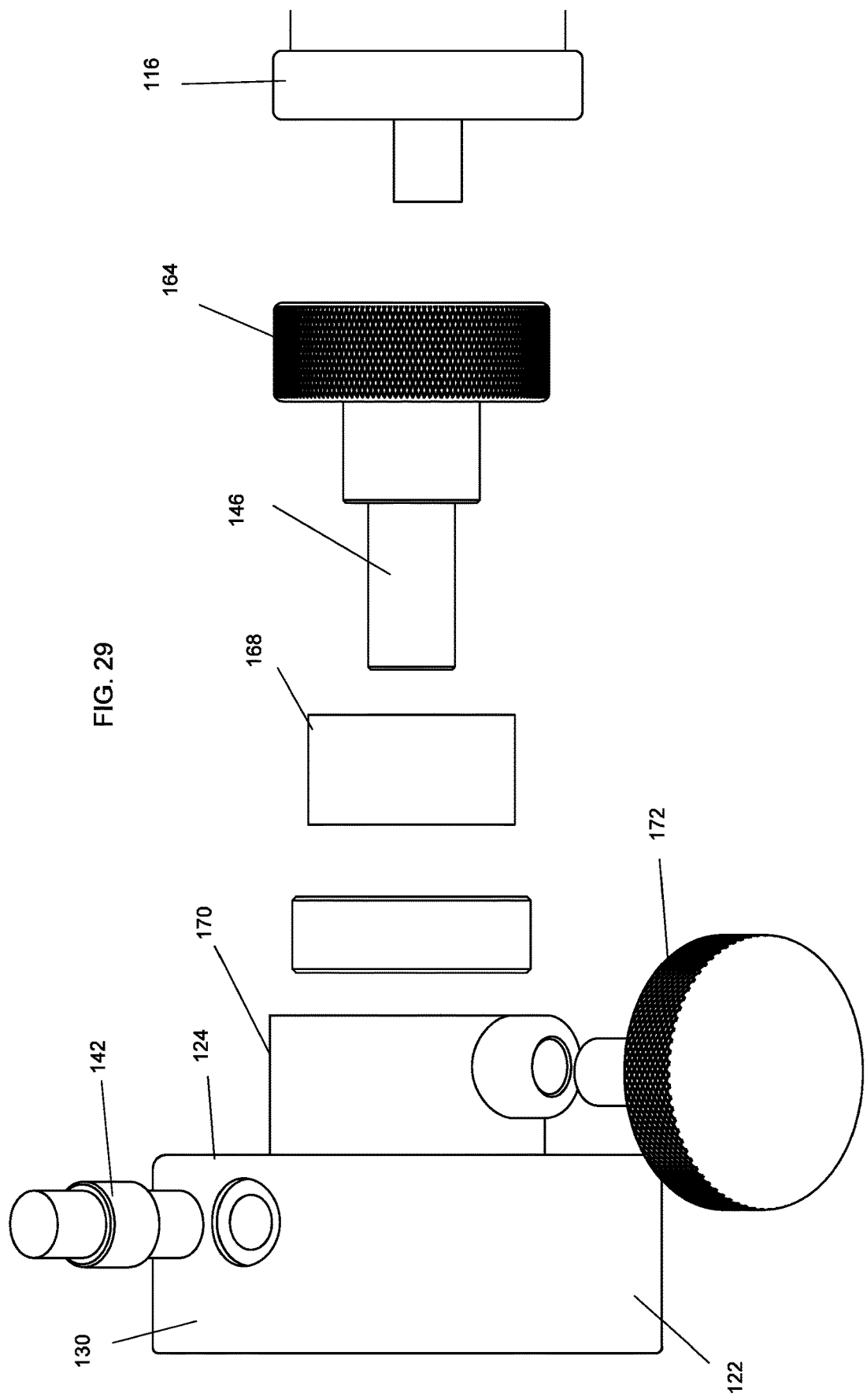
FIG. 29 is an exploded side elevational view of the bottom part of gearbox of FIG. 26.

Referring to FIGS. 26-28, the first gearbox 112 houses a main gear 144 which is secured in a fixed position with a fastener 160 to a central mounting post 146 which extends into and through the bottom wall 124 of the first gearbox 112. The first gearbox 112 also includes a set of rotary dampers. For instance, in the illustrated embodiment, the first gearbox 112 includes four separate rotary dampers 148, 150, 152 and 154, including two rotary dampers, 148 and 150, secured to and mounted within the body 122 of the gearbox 112 with fasteners 162 and two rotary dampers, 152 and 154, mounted within the lid 126 of the gearbox 112 with fasteners (not shown) on an opposite side of the main gear 144. The gear teeth of the main gear 144 and the corresponding gear teeth of the rotary dampers, 148, 150, 152 and 154, engage and mesh. With this arrangement, while the main gear 144 and post 146 are maintained in a fixed-position relative to the handle 116 (which can be screwed into the exterior knurled end 164 of the post 146), the remainder of the first gearbox 112 is permitted to rotate about the main gear 144 with the rotation being damped due the engagement of the gear teeth of the rotary dampers 148, 150, 152 and 154 with the gear teeth of the main gear 144 as the rotary dampers follow a circular path about the main gear.

The second gearbox 114 may have an identical construction as that disclosed above for the first gearbox 112 and may function in the same manner as the first gearbox 114. Thus, the second gearbox 114 may include a main gear, a central mounting post, and a set of rotary dampers. However, the exterior end of the post of the second gearbox 114 is fixed to the mounting fastener 142 and thus remains in a fixed position with the main gear of the second gearbox 114 relative to the mounting fastener 142.

According to the above gearbox construction, the damping characteristics of the first gearbox 112, the second gearbox 114, or both gearboxes, 112 and 114, may be readily altered by the end user. For instance, the lid of either gearbox may be removed (by removing a fastener 166) and the number of rotary dampers contained with the gearbox may be changed. As an example, for a relatively heavy camera, all four rotary dampers 148, 150, 152 and 154 may be mounted within the gearbox. Alternatively, for a relatively lighter weight camera, one, two or three of the rotary dampers 148, 150, 152 and 154 may be removed to reduce the amount of rotational damping. If desired, rotation of one of the gearboxes may be damped to a greater extent than the other by including a different number of rotary dampers in each gearbox, or both may be damped an equal amount by including the same number of rotary dampers in each gearbox.

Thus, by setting the appropriate amount of damping for a particular camera of a particular size and weight, the camera may be maintained in a desired level and balanced image capturing position regardless of the movements of the end user holding or otherwise supporting the handle or the movements of other mounting components and the movements of the camera may be damped along two axes of rotation.

If desired, one or both gearboxes, 112 and 114, may be prevented from rotation. For this purpose, a washer 168 may be located within a bottom extension 170 of the gearbox such that it extends about the post 146 and may be engaged by a thumb screw 172. If the thumb screw 172 is tightened against the washer 168, rotation of the housing or body of the gearbox will be prevented relative to the post. Alternatively, if the thumb screw 172 is not tightened against the washer 168, the housing or body of the gearbox is permitted to rotate relative to the post 146. In this manner, each gearbox, 112 and 114, may be independently set to be able to rotate relative to the posts or to be prevented from rotation.

Figure 23:
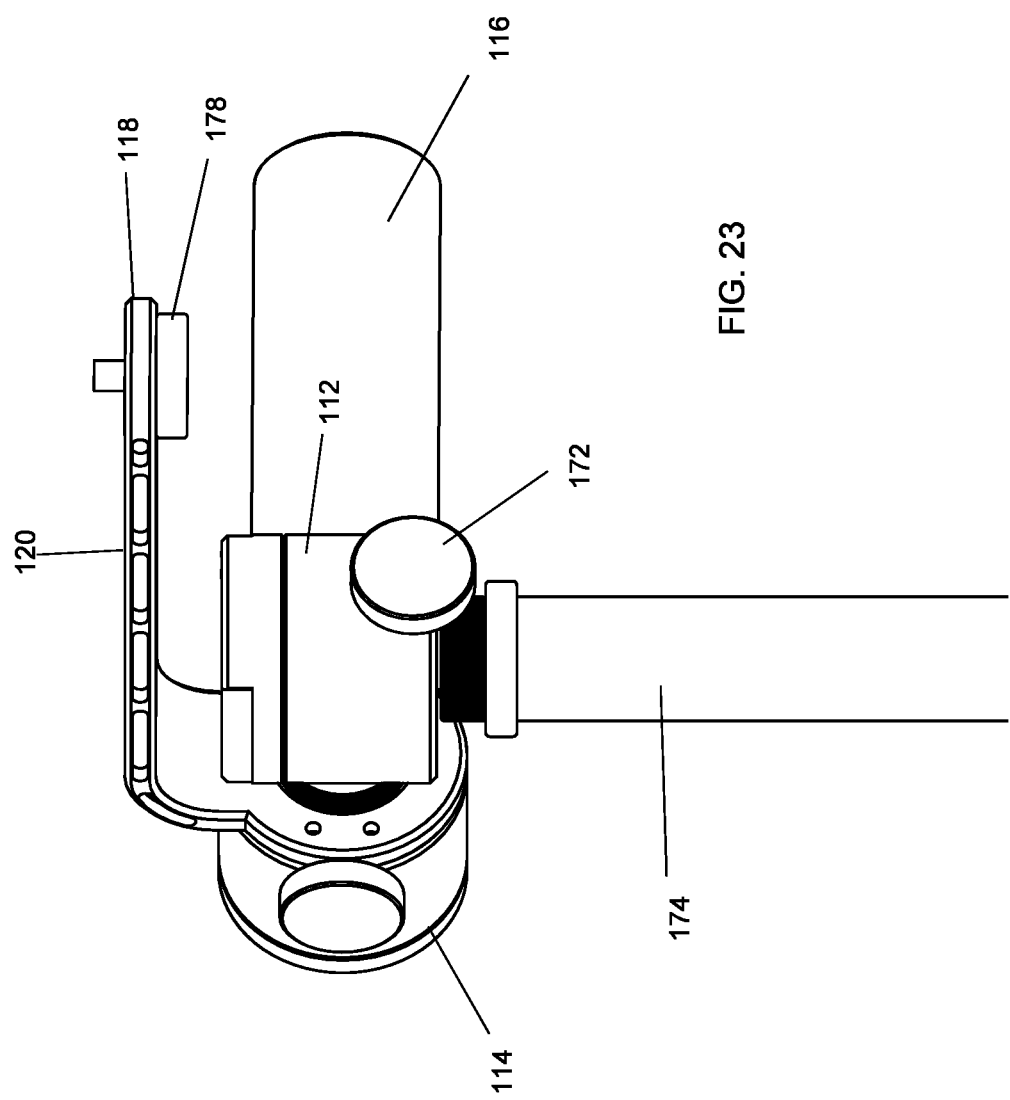
FIG. 23 is an elevational view of the camera gimbal of FIG. 20 mounted on a tripod head according to an embodiment.
Figure 24:
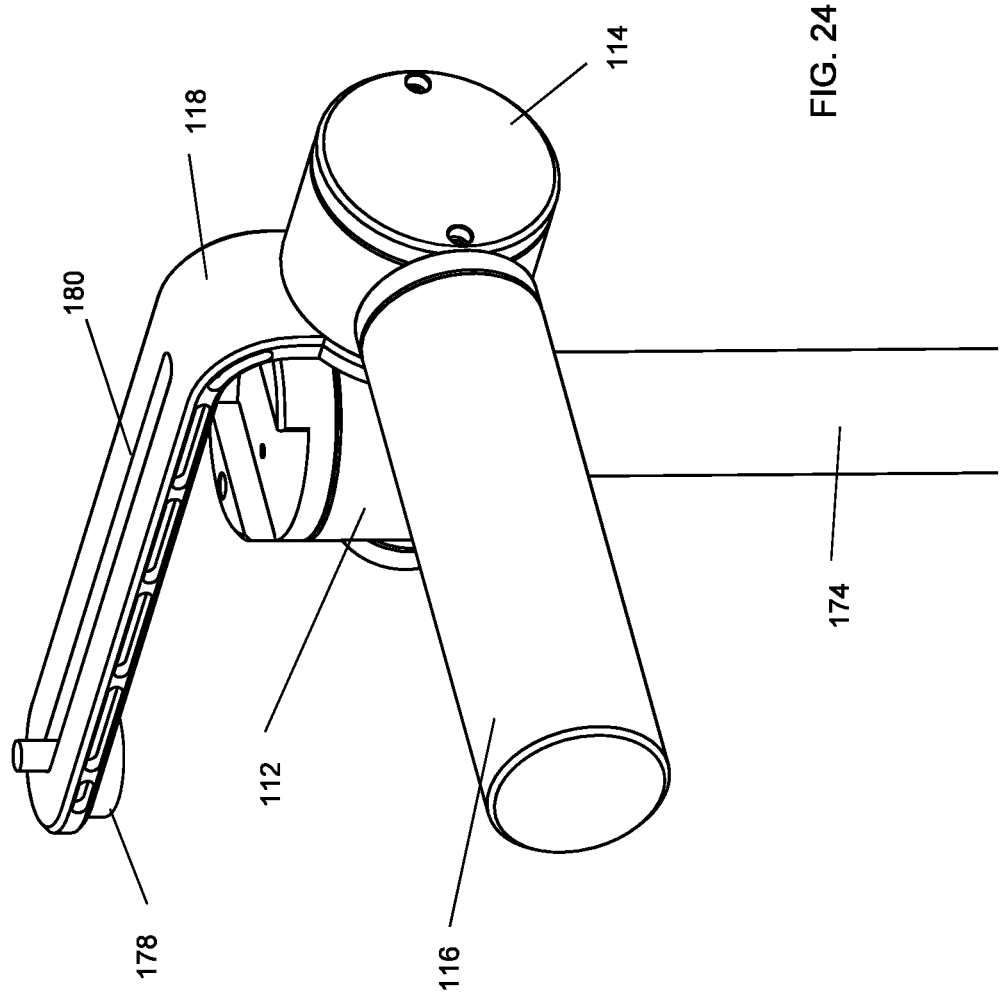
FIG. 24 is a perspective view from the opposite side of the camera gimbal and tripod head of FIG. 23.
Figure 25:
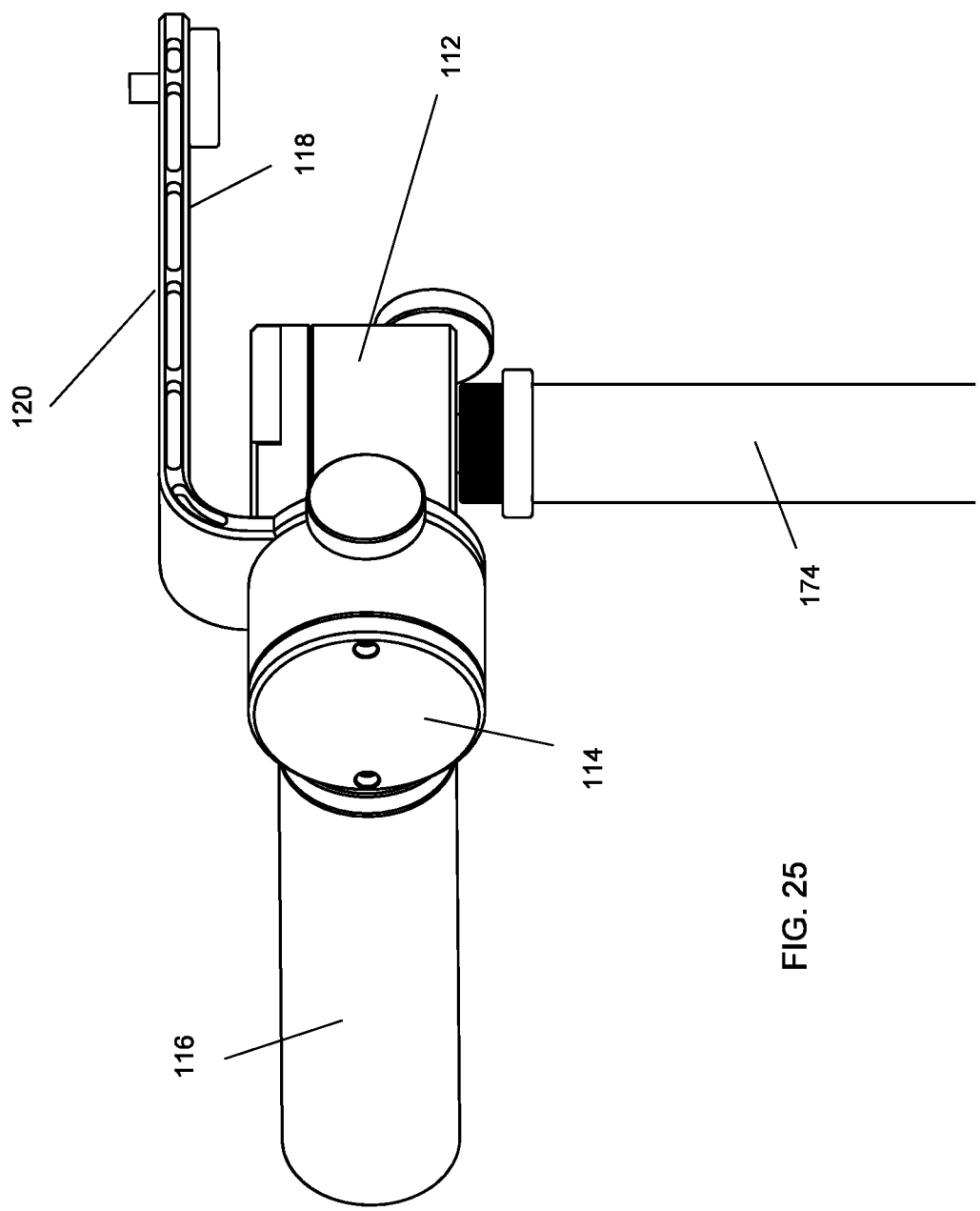
FIG. 25 is an elevational view of the camera gimbal and tripod head of FIG. 23.

FIGS. 23-25 show the gimbal 110 affixed to a head of a tripod 174. For example, the top of the tripod may be screwed into the exterior knurled end 164 of the post 146 of the first gearbox 112. The handle 116 may be re-positioned as discussed above such that is screwed into the sidewall of the second gearbox 114. In this position, the handle 116 may be gripped by the end user to control the movements of a camera fixed on the L-bracket 118. The thumb screws 172 may be used to secure the position of the camera on the tripod head when a stationary image recording position or direction is desired. In addition, individual level indicators, such as bubble levelers (not shown), may be connected to each of the lids, 126 and 136, of the gearboxes, 112 and 114, to enable ready level indication of the camera relative to a ground surface.

The L-bracket may have a locking fastener 178 that extends through a slot 180 extending along a length of the L-bracket and that interconnects to the camera. This allows cameras of different sizes to be properly positioned and supported in a balanced manner on the gimbal 110. The L-bracket 118 may be secured to the bottom wall 134 of the second gearbox 114 with fasteners 182 or the like.

According to the embodiments disclosed above, a portable gimbal is provided that does not require a power source and that is purely-mechanical relying solely on the force of gravity to automatically maintain or return the camera to a level image capturing position. The damping characteristics of the gimbal may be set to be properly used with different cameras of different weights and sizes and to provide adjustable damping/counterbalance characteristics.

The various components described above may be made of metallic or non-metallic materials, resins, plastic, composite materials, or the like. The above description illustrates an embodiment of how aspects of the present invention may be implemented, and are presented to illustrate the flexibility and advantages of particular embodiments as defined by the following claims, and should not be deemed to be the only embodiment. One of ordinary skill in the art will appreciate that based on the above disclosure and the following claims, other arrangements, embodiments, implementations and equivalents may be employed without departing from the scope hereof as defined by the claims. Accordingly, the specification and figures are to be regarded in an illustrative rather than a restrictive sense, and all such modifications are intended to be included within the scope of the present invention. The present invention is defined solely by the appended claims and equivalents thereof.

I claim:

1. A camera gimbal, comprising:
a gearbox including a housing containing therein a central main gear secured to a bearing shaft in a fixed-position relative to said bearing shaft and a rotary damper secured to the housing at a fixed-location relative to the housing such that the rotary damper is engaged with said central main gear in a manner permitting rotation of said rotary damper about a periphery of said main central gear and about an axis of rotation extending longitudinally through said bearing shaft and said central main gear;
a first arm from which said bearing shaft extends;
a second arm that provides at least a part of said housing and is rotatable relative to said first arm; and
a camera-mount extending from said second arm and including a counterweight;
whereby the camera gimbal is purely-mechanical in operation and is without connection to a power source relying solely on gravity acting on a camera mounted on said second arm and said counterweight to cause rotation of said first arm relative to said second arm to maintain the camera mounted on said second arm in a relatively level position while said rotary damper damps the rotational movement of said first arm relative to said second arm.

2. The camera gimbal according to claim 1, wherein said housing comprises a lid that is secured to said second arm, and wherein said rotary damper is secured to said lid.

3. The camera gimbal according to claim 2, wherein a handle mounting flange extends from said first arm.

4. The camera gimbal according to claim 3, wherein a portable handle is secured to said handle mounting flange of said first arm.

5. The camera gimbal according to claim 1, wherein said central main gear has a periphery with gear teeth and said rotary damper has a periphery with gear teeth, and wherein said gear teeth of said central main gear are engaged and mesh with the gear teeth of said rotary damper.

6. The camera gimbal according to claim 1, wherein said rotary damper is a hydraulic rotary damper gear.

7. The camera gimbal according to claim 1, wherein said camera mount includes a holder and a camera mount component rotatable within said holder and securable therein in a fixed condition with a fastener.

8. The camera gimbal according to claim 1, wherein said housing contains only a single rotary damper.

9. The camera gimbal according to claim 8, wherein said counterweight is located directly beneath and adjacent a camera mounted on the camera mount of said second arm.

10. A camera gimbal, comprising:
a first arm including a handle mounting flange;
a second arm rotatable relative to said first arm and including a camera-mount extending therefrom, said camera mount including a counterweight;
a gearbox interconnecting said first arm to said second arm and including a housing containing therein a central main gear secured to a bearing shaft in a fixed-position relative to said bearing shaft and a single rotary damper secured to the housing at a fixed-location relative to the housing such that the single rotary damper is engaged with said central main gear in a manner permitting rotation of said single rotary damper about a periphery of said main central gear and about an axis of rotation extending longitudinally through said bearing shaft and said central main gear;
wherein said bearing shaft extends from said first arm, said housing comprises a lid that is secured to said second arm, and said single rotary damper is secured to said lid; and
wherein said central main gear has a periphery with gear teeth and said single rotary damper has a periphery with gear teeth, and said gear teeth of said central main gear are engaged and mesh with the gear teeth of said single rotary damper;
whereby the camera gimbal is purely-mechanical in operation and is without connection to a power source relying solely on gravity acting on a camera mounted on said second arm and said counterweight to cause rotation of said first arm relative to said second arm to maintain the camera mounted on said second arm in a relatively level position while said rotary damper damps the rotational movement of said first arm relative to said second arm.

11. The camera gimbal according to claim 10, wherein said counterweight is located directly beneath and adjacent a camera mounted on said camera mount.

12. The camera gimbal according to claim 11, wherein a portable handle is secured to said handle mounting flange of said first arm.

13. The camera gimbal according to claim 12, wherein said single rotary damper is a hydraulic rotary damper gear.

14. The camera gimbal according to claim 13, wherein said camera mount includes a holder and a camera mount component rotatable within said holder and securable therein in a fixed condition with a fastener, and wherein said counterweight is securable to said holder.

* * * * *